US012054200B2

(12) United States Patent
Yamamoto (10) Patent No.: US 12,054,200 B2
(45) Date of Patent: Aug. 6, 2024

(54) WORKING VEHICLE (71) Applicant: KUBOTA CORPORATION, Osaka (JP)

(72) Inventor: Yuya Yamamoto, Sakai (JP)

(73) Assignee: KUBOTA CORPORATION, Osaka (JP)

(*) Notice: Subject to any disclaimer, the term of this patent is extended or adjusted under 35 U.S.C. 154(b) by 298 days.

(21) Appl. No.: 17/546,147

(22) Filed: Dec. 9, 2021

(65) Prior Publication Data
US 2022/0097702 A1 Mar. 31, 2022

Related U.S. Application Data (63) Continuation of application No. PCT/JP2020/024418, filed on Jun. 22, 2020.

(30) Foreign Application Priority Data

Jun. 28, 2019 (JP) .................. 2019-122518

(51) Int. Cl.
*B62D 49/00* (2006.01)
*B60Q 1/34* (2006.01)
(Continued)

(52) U.S. Cl.
CPC ............ *B62D 49/00* (2013.01); *B60Q 1/346* (2013.01); *B60Q 1/38* (2013.01); *B60Q 1/46* (2013.01);
(Continued)

(58) Field of Classification Search
CPC .......... B62D 49/06; B60Q 1/34; B60Q 1/346; B60Q 1/38; B60Q 1/46; B60Q 1/30;
(Continued)

(56) References Cited

U.S. PATENT DOCUMENTS 5,549,362 A * 8/1996 Broome .................. B60T 8/327
303/3
6,239,696 B1 5/2001 Berger et al.
(Continued)

FOREIGN PATENT DOCUMENTS

DE 20 2005 017 151 U1 12/2005
DE 102007010013 A1 * 9/2008 ............ B60W 30/16
(Continued)

OTHER PUBLICATIONS

"Bobframe" regarding "Starting with PTO Engaged". In TractorByNet [online forum]. Dated Apr. 7, 2019, Retrieved Nov. 28, 2023. URL: <https://www.tractorbynet.com/forums/threads/starting-with-PTO-engaged.410808/> (Year: 2019).*
(Continued)

*Primary Examiner* — Jaime Figueroa
*Assistant Examiner* — Benjamin J Brosh
(74) *Attorney, Agent, or Firm* — Keating & Bennett, LLP (57) ABSTRACT

A working vehicle includes a prime mover provided on a vehicle body, a first indicator light provided on the vehicle body, a second indicator light provided on a working device connected to the vehicle body, and an integrated controller including a first controller portion to control the prime mover, and a second controller portion to control the first indicator light and the second indicator light.

8 Claims, 9 Drawing Sheets

(51) Int. Cl.
  *B60Q 1/38* (2006.01)
  *B60Q 1/46* (2006.01)
  *B60W 10/06* (2006.01)
  *B60W 10/30* (2006.01)
  *B60W 30/18* (2012.01)
  *B62D 49/06* (2006.01)

(52) U.S. Cl.
  CPC ............ *B60W 10/06* (2013.01); *B60W 10/30* (2013.01); *B60W 30/18009* (2013.01); *B60W 2300/152* (2013.01); *B60W 2510/10* (2013.01); *B60W 2510/30* (2013.01); *B60W 2530/203* (2020.02); *B60W 2540/06* (2013.01); *B60W 2710/06* (2013.01); *B60W 2710/30* (2013.01); *B60W 2756/10* (2020.02); *B62D 49/06* (2013.01)

(58) Field of Classification Search
  CPC ...... B60Q 1/305; B60Q 11/007; B60W 10/06; B60W 10/04; B60W 10/08; B60W 10/30; B60W 30/18009; B60W 2300/152; B60W 2510/10; B60W 2510/30; B60W 2530/203; B60W 2540/06; B60W 2710/06; B60W 2710/30; B60W 2756/10
  See application file for complete search history.

(56) References Cited

U.S. PATENT DOCUMENTS

| | | | | |
|---|---|---|---|---|
| 6,797,884 | B2* | 9/2004 | Kubota | H02G 3/088 |
| | | | | 174/67 |
| 2008/0052665 | A1* | 2/2008 | Bray | G06F 30/327 |
| | | | | 717/105 |
| 2008/0224708 | A1* | 9/2008 | Mannerfelt | H05B 47/20 |
| | | | | 324/414 |
| 2010/0026478 | A1* | 2/2010 | Ekchian | B60Q 1/34 |
| | | | | 340/471 |
| 2014/0083392 | A1* | 3/2014 | Cattani | F02D 41/08 |
| | | | | 123/339.14 |
| 2015/0203026 | A1* | 7/2015 | Schotanus | B60Q 1/2615 |
| | | | | 362/520 |
| 2017/0100975 | A1* | 4/2017 | Ruiz | G01R 31/54 |
| 2017/0322249 | A1* | 11/2017 | Brooks | G01R 31/44 |
| 2018/0354412 | A1 | 12/2018 | Ogihara et al. | |
| 2019/0138016 | A1* | 5/2019 | Ogihara | G05D 1/0212 |
| 2019/0384321 | A1 | 12/2019 | Nishi et al. | |
| 2020/0298757 | A1* | 9/2020 | Thompson | G07C 5/0808 |

FOREIGN PATENT DOCUMENTS

| | | |
|---|---|---|
| EP | 2 080 667 A1 | 7/2009 |
| EP | 2 628 642 A2 | 8/2013 |
| JP | 62-59737 U | 4/1987 |
| JP | 10-208194 A | 8/1998 |
| JP | 2012-121456 A | 6/2012 |
| JP | 2014-133438 A | 7/2014 |
| JP | 2015-189358 A | 11/2015 |
| JP | 2016-199090 A | 12/2016 |
| WO | 2017/104329 A1 | 6/2017 |
| WO | 2018/135234 A1 | 7/2018 |

OTHER PUBLICATIONS

Oldschool Farmer, "BASIC . . . How to drive a tractor", Retrieved from the Internet Mar. 2024, NPL Date: Aug. 16, 2018, URL: <https://www.youtube.com/watch?v=Y7Lx-Nw-06s> (Year: 2018).*
TractorByNet, "Seat Switch", Retrieved from the Internet Mar. 2024, NPL Date: Feb. 2010, URL: <https://www.tractorbynet.com/forums/threads/seat-switch.164780/> (Year: 2010).*
English translation of foreign patent literature DE 102007010013 A1 provided in the attached PDF filed with the authority version of the document. (Year: 2008).*
Official Communication issued in International Patent Application No. PCT/JP2020/024418, mailed on Aug. 18, 2020.
Official Communication issued in corresponding European Patent Application No. 20830590.4, mailed on Jun. 27, 2023.

\* cited by examiner

| | First driving condition | | | |
|---|---|---|---|---|
| | First state | Second state | Third state | Driving |
| | Key switch (Ignition switch) | Speed-changing state (neutral position) | PTO driving (PTO switch) | Prime mover |
| | ON | ON | ON | Starting |
| | OFF | ON | ON | Stopping (without starting) |

Fig.3B

| | Second driving condition | | | | Driving |
|---|---|---|---|---|---|
| First state | Second state | Third state | Fourth state | Fifth state | |
| Key switch (Ignition switch) | Speed-changing state (neutral position) | PTO driving (PTO switch) | Seat switch | Parking switch | Prime mover |
| ON | ON | ON | OFF | ON | Maintaining the driving |
| OFF | OFF | ON | OFF | ON | Stopping the driving |

Fig.4

| Lighting condition | | | | Driving | | |
|---|---|---|---|---|---|---|
| Sixth state | | Seventh state | First indicator light | Second indicator light | Flashing state |
| Directional indicator switch | | Hazard | | | |
| Left | Right | | | | |
| ON | OFF | OFF | Left Flashing/ Right Extinguished | Left Flashing/ Right Extinguished | First flashing form |
| OFF | ON | OFF | Left Extinguished/ Right Flashing | Left Extinguished/ Right Flashing | First flashing form |
| OFF | OFF | ON | Left & Right Flashing | Left & Right Flashing | Second flashing form |

Fig.5A

| Prime mover-driving | | Prime mover-stopping | | Lighting condition (lighting and flashing) |
|---|---|---|---|---|
| First driving condition | Second driving condition | First driving condition | Second driving condition | |
| First pattern | Eleventh pattern | Twenty-first pattern | Thirty-first pattern | Fifty-first pattern |
| Second pattern | Twelfth pattern | Twenty-second pattern | Thirty-second pattern | Fifty-second pattern |
| Third pattern | Thirteenth pattern | Twenty-third pattern | Thirty-third pattern | Fifty-third pattern |
| .... | .... | .... | .... | .... |

Fig.5B

| Region | Prime mover-driving | | Prime mover-stopping | | Lighting condition (lighting and flashing) | Setting data |
|---|---|---|---|---|---|---|
| | First driving condition | Second driving condition | First driving condition | Second driving condition | | |
| First region | First pattern | Thirteenth pattern | Twenty-first pattern | Thirty-second pattern | Fifty-second pattern | Setting data A |
| Second region | First pattern | Twelfth pattern | Twenty-first pattern | Thirty-second pattern | Fifty-second pattern | Setting data B |
| Third region | Second pattern | Eleventh pattern | Twenty-third pattern | Thirty-third pattern | Fifty-third pattern | Setting data C |
| Fourth region | Third pattern | Eleventh pattern | Twenty-third pattern | Thirty-first pattern | Fifty-first pattern | Setting data D |
| . . . | . . . | . . . | . . . | . . . | . . . | . . . |

WORKING VEHICLE

CROSS REFERENCE TO RELATED APPLICATIONS

This application is a continuation application of International Application No. PCT/JP2020/024418, filed on Jun. 22, 2020, which claims the benefit of priority to Japanese Patent Application No. 2019-122518, filed on Jun. 28, 2019. The entire contents of each of these applications are hereby incorporated herein by reference.

BACKGROUND OF THE INVENTION

1. Field of the Invention

The present invention relates to a working vehicle.

2. Description of the Related Art

A technique disclosed in Japanese Unexamined Patent Publication No. 2015-189358 is known, which is a technique for displaying an indicator light in a working machine such as a tractor. The working machine of Japanese Unexamined Patent Publication No. 2015-189358 includes a signal generating unit configured to generate a flash signal for at least flashing a pair of indicator lights, and a priority setting unit configured to prioritize either a flashing action of the indicator lights based on an operation of a directional instruction tool or another flashing action of the indicator lights based on an operation of a hazard instruction tool. And, a switching unit configured to turn on or off the pair of indicator lights based on a control signal from the priority setting unit is connected to the signal generating unit and the pair of indicator lights therebetween.

SUMMARY OF THE INVENTION

In Japanese Unexamined Patent Publication No. 2015-189358, either a setting for hazard priority or another setting for directional indicator priority can be adopted according to a destination for export. Either the setting for hazard priority or the other setting for directional indicator priority can be adopted according to a destination for export in Japanese Unexamined Patent Publication No. 2015-189358. However, if specifications for the destination are changed or if specifications other than that of the indicator lights are differed according to destinations for export, it causes a problem that various modifications have to be made, such as changing of connections between harnesses or setting of conditions.

Preferred embodiments of the present invention provide working vehicles each capable of being easily adapted to a destination for export.

A working vehicle according to a preferred embodiment of the present invention includes a prime mover provided on a vehicle body, a first indicator light provided on the vehicle body, a second indicator light provided on a working device connected to the vehicle body, and an integrated controller including a first controller portion to control the prime mover, and a second controller portion to control the first indicator light and the second indicator light.

The integrated controller may include a storage to store a driving condition required for the first controller portion to drive the prime mover, and a lighting condition required for the second controller portion to either light or extinguish each of the first indicator light and the second indicator light.

A working vehicle according to a preferred embodiment of the present invention may further include a connector connectable to an external terminal to store setting data including the driving condition and the lighting condition. The integrated controller is configured or programmed to cause the storage to store the setting data when the setting data is transmitted from the external terminal to the integrated controller via the connector and when a combination of the driving condition and the lighting condition in the transmitted setting data coincides with a predetermined combination of the driving condition and the lighting condition.

A working vehicle according to a preferred embodiment of the present invention may further include an ignition switch to perform starting of the prime mover, a speed controller to change a speed of the vehicle body during traveling, and a PTO (Power Take-Off) driver to be driven by power from the prime mover and transmit a driving force thereof to the working device. The first controller portion is configured or programmed to drive the prime mover when a switching state of the ignition switch, a speed-changing state of the speed controller and a driving state of the PTO driver coincide with those defined as the driving condition.

A working vehicle according to a preferred embodiment of the present invention may further include a directional indicator switch to flash the first and second indicator lights for direction indication, and a hazard switch to flash the first and second indicator lights for hazard indication. The second controller portion configured or programmed to flash each of the first and second indicator lights when an operation state of the directional indicator switch and an operation state of the hazard switch coincide with those defined as the driving condition.

The storage may have previously stored therein a first disconnection judgment condition required to determine that the first indicator light is disconnected and a second disconnection judgment condition required to determine that the second indicator light is disconnected. The second controller portion is configured or programmed to determine that the first indicator light is disconnected when the first indicator light is determined to be in the first disconnection judgment condition, and to determine that the second indicator light is disconnected when the second indicator light is determined to be in the second disconnection judgment condition.

The integrated controller may include a single casing.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

The preferred embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, preferred embodiments of the present invention will be described below.

Figure 6:
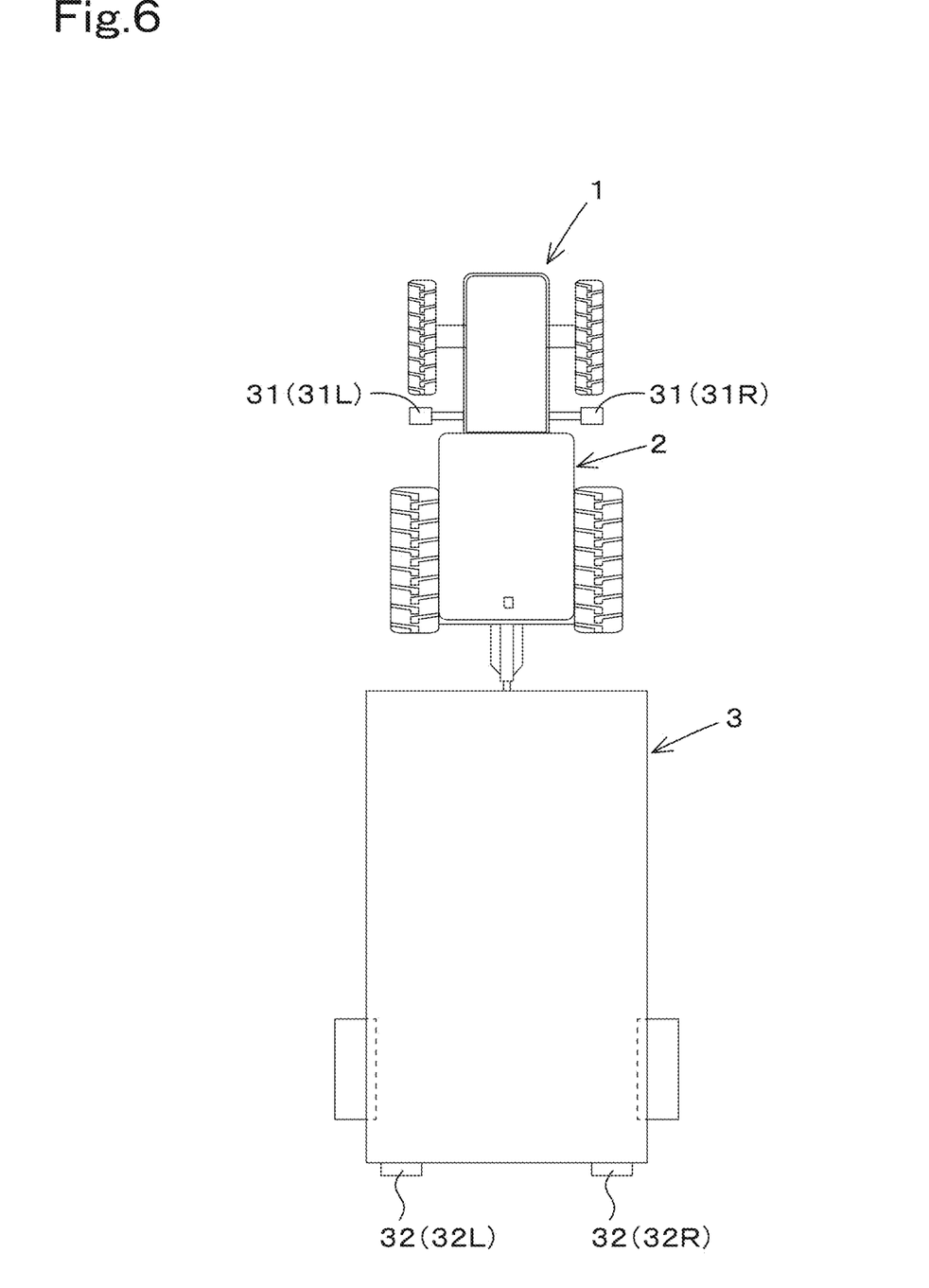
FIG. 6 is a plan view of a tractor.
Figure 7:
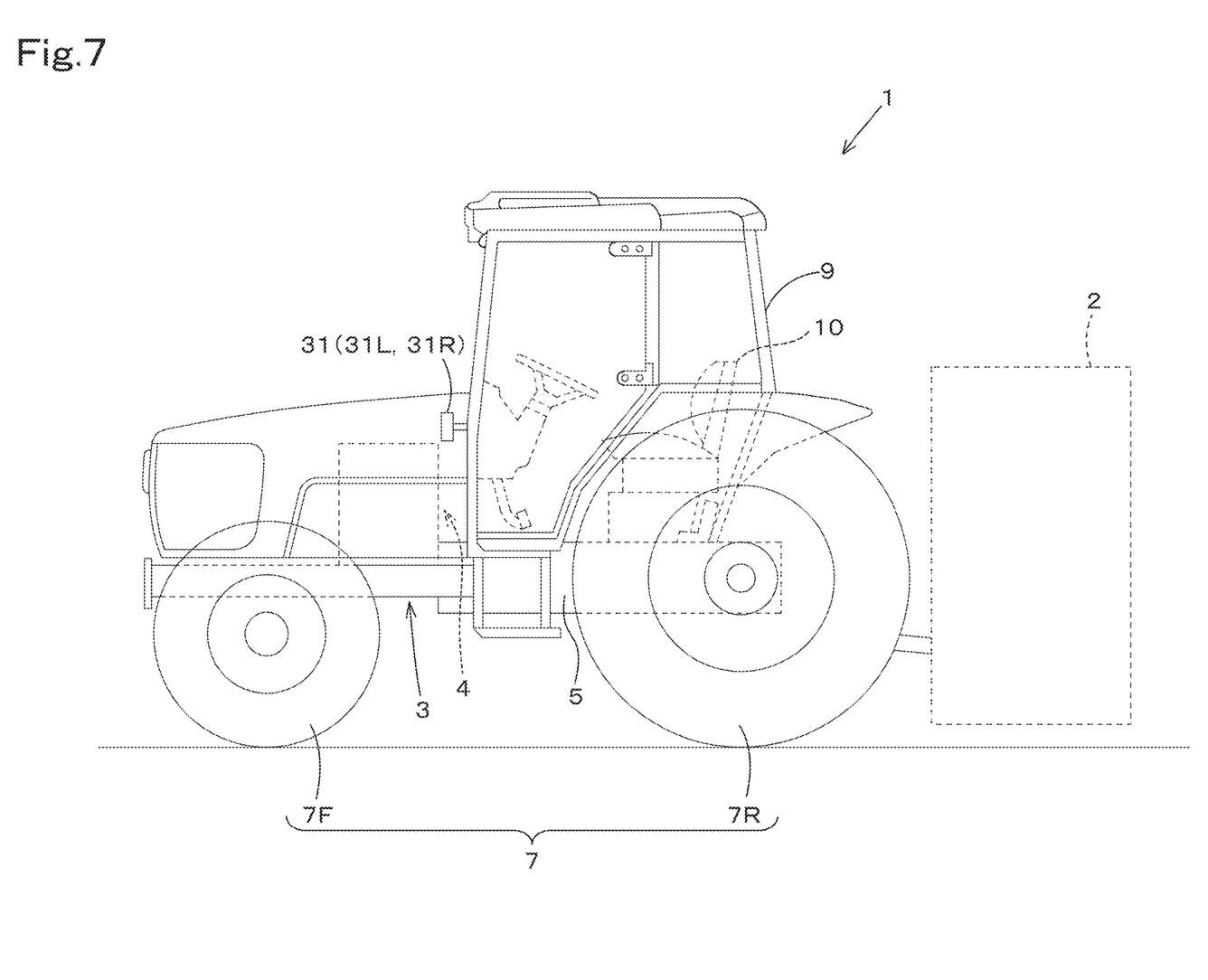
FIG. 7 is a side view of the tractor.

FIG. 7 shows a side view of a working vehicle 1 according to a preferred embodiment of the present invention, and FIG. 6 shows a plan view of the working vehicle 1 according to the preferred embodiment. In the present preferred embodiment, the working vehicle 1 is a tractor. However, the working vehicle 1 is not limited to the tractor, and may be an agricultural machine (agricultural vehicle) such as a combine harvester or a transplanter.

Hereinafter, a forward direction from a driver sitting on a driver's seat 10 of the tractor (working vehicle) 1 is described as the front, a backward direction from the driver is described as the rear, a leftward direction from the driver is described as the left, and a rightward direction from the driver is described as the right. In addition, a horizontal direction, which is a direction orthogonal to a fore-and-aft direction of the working vehicle 1, is described as a width direction in a vehicle body.

As shown in FIG. 7, the tractor 1 includes a vehicle body 3 including a traveling device 7, a prime mover 4, and a speed controller 5. The traveling device 7 is a device including front wheels 7F and rear wheels 7R. The front wheels 7F may be tire types or crawler types. In addition, the rear wheels R7 may be tire types or crawler types. The prime mover 4 is an internal combustion engine such as a gasoline engine or diesel engine, an electric motor, or the like. In this preferred embodiment, the prime mover 4 is a diesel engine.

The speed controller 5 is capable of changing a speed of rotary force to propel the traveling device 7, and is capable of switching the traveling direction of the traveling device 7 to forward or backward. A cabin 9 is provided on the vehicle body 3, and a driver's seat 10 is provided in the cabin 9.

In addition, a lifting device 8 is disposed at a rear portion of the vehicle body 3. The working device 2 can be attached to and detached from the lifting device 8. In addition, the lifting device 8 can raise and lower the working device 2 attached thereto. The working device 2 is a cultivating device for cultivation, a fertilizer spreading device for spreading fertilizer, a pesticide spreading device for spreading pesticide, a harvester for harvesting, a mowing device for mowing grass or the like, a spreading device for spreading the grass or the like, a raking device for raking the grass or the like, a baling device for baling the grass or the like, a trailer for transporting, or the like.

As shown in FIG. 6, the vehicle body 3 of the tractor 1 includes a first indicator light 31. The first indicator light 31 is a lamp to light, be extinguished, and flash. The first indicator light 31 includes a first left indicator light 31L disposed on a left portion of the vehicle body 3 and a first right indicator light 31R disposed on a right portion of the vehicle body 3. In addition, a second indicator light 32 is provided on the working device 2. The second indicator light 32 is a lamp to light, be extinguished, and flash. The second indicator light 32 includes a second left indicator light 32L disposed on a left portion of the working device 2 and a second right indicator light 32R disposed on a right portion of the working device 2.

Figure 1:
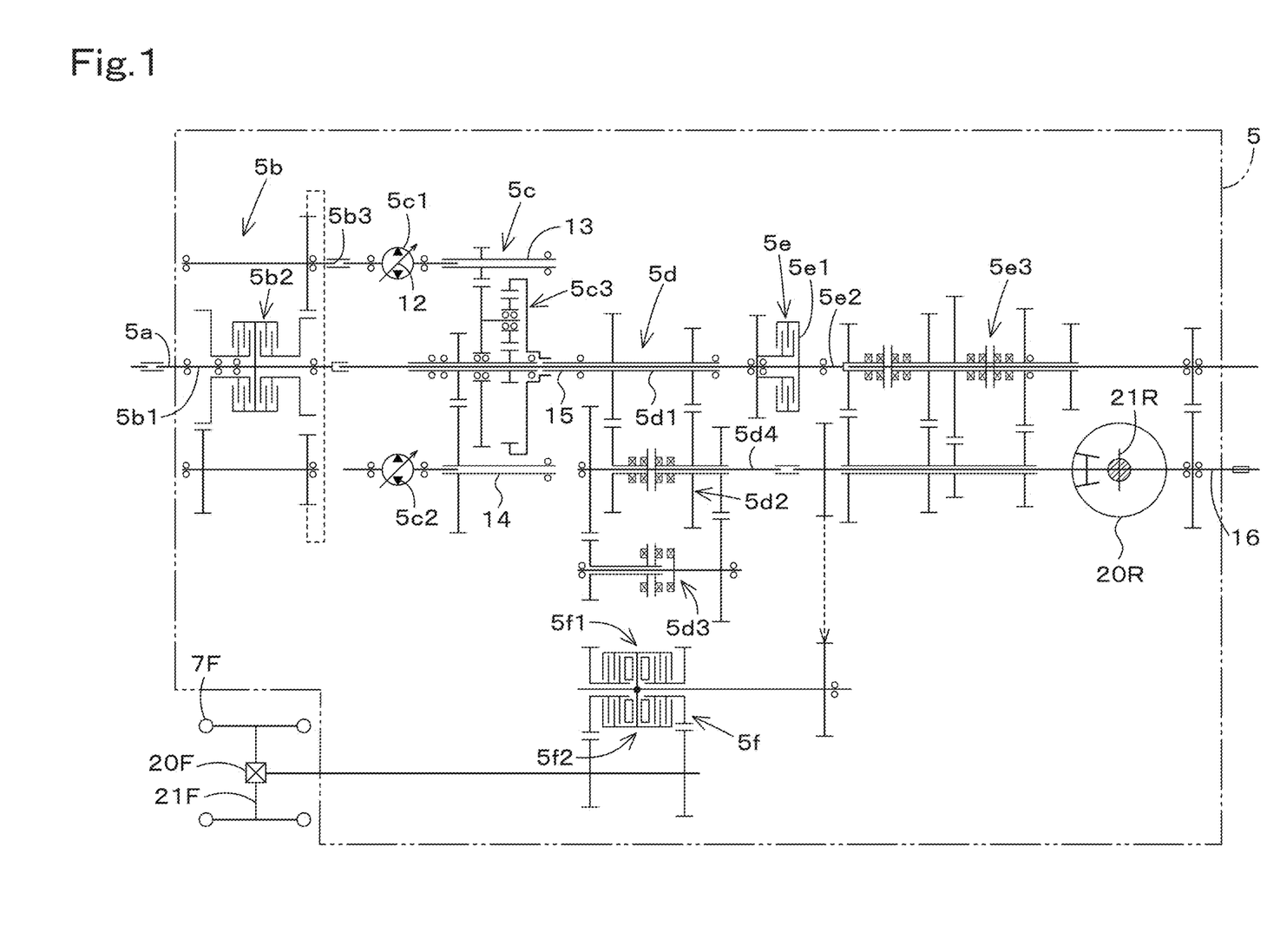
FIG. 1 is a schematic view of a whole of a speed controller.

As shown in FIG. 1, the speed controller 5 includes a main shaft (propulsion shaft) 5a, a shuttle unit 5b, a main speed-changing unit 5c, a sub speed-changing unit 5d, a PTO power transmission unit 5e, and a front speed-changing unit 5f. The propulsion shaft 5a is rotatably supported by a housing case of the speed controller 5, and a power from the crankshaft of the prime mover 4 is transmitted to the propulsion shaft 5a.

The shuttle unit 5b includes a shuttle shaft 5b1 and a forward/backward-traveling switching unit 5b2. A power from the propulsion shaft 5a is transmitted to the shuttle shaft 5b1. The forward/backward-traveling switching unit 5b2 includes, for example, a hydraulic clutch or the like, and is configured to switch, through engagement and disengagement of the hydraulic clutch, a rotational direction of the shuttle shaft 5b1, i.e., a traveling direction of the tractor 1 between the forward traveling and the backward traveling.

The main speed-changing unit 5c is a continuously variable speed-changing mechanism that changes the input power in a stepless manner. The continuously variable speed-changing mechanism includes a hydraulic pump 5c1, a hydraulic motor 5c2, and a planetary gear mechanism 5c3. The hydraulic pump 5c1 is rotated by a power from an output shaft 5b3 of the shuttle unit 5b. The hydraulic pump 5c1 is, for example, a variable displacement pump including a swash plate 12, and is configured to change an angle of the swash plate 12 (swash plate angle) to change a flow rate of hydraulic fluid delivered from the hydraulic pump 5c1. The hydraulic motor 5c2 is a motor to be rotated by the hydraulic fluid delivered from the hydraulic pump 5c1 through a hydraulic circuit such as piping. A rotation speed of the hydraulic motor 5c2 can be changed by changing the swash plate angle of the hydraulic pump 5c1 or by changing a power to be input to the hydraulic pump 5c1.

The planetary gear mechanism 5c3 includes a plurality of gears (toothed wheels) and power transmission shafts including an input shaft and an output shaft, and includes an input shaft 13 to which a power of the hydraulic pump 5c1 is input, an input shaft 14 to which a power of the hydraulic motor 5c2 is input, and an output shaft 15 from which the power is output. The planetary gear mechanism 5c3 combines the powers of the hydraulic pump 5c1 and the hydraulic motor 5c2 and then transmits the combined power to the output shaft 15.

In this manner, according to the main speed-changing unit 5c, the power to be output to the sub speed-changing unit 5d can be changed by changing the swash plate angle of the swash plate 12 of the hydraulic pump 5c1, a rotation speed of the prime mover 4, and the like. The main speed-changing unit 5c is a continuously variable speed-changing mechanism. Alternatively, the main speed-changing unit 5c may be a stepped speed-changing mechanism including gears to change the speed.

The sub speed-changing unit 5d is a speed-changing mechanism including a plurality of stepped-speed gears (toothed wheels) to speed-shift the transmitted power, and selects appropriate gears to be drivingly connected (engaged) among the plurality of gears to change (that is, speed-change) the power input from the output shaft 15 of the planetary gear mechanism 5c3 and output the speed-changed power to the sub speed-changing unit 5d. The sub speed-changing unit 5d includes an input shaft 5d1, a first speed-changing clutch 5d2, a second speed-changing clutch 5d3, and an output shaft 5d4. The input shaft 5d1 is a shaft to which the power of the output shaft 15 of the planetary gear mechanism 5c3 is input, and inputs the input power to the first speed-changing clutch 5d2 and the second speed-changing clutch 5d3 through the gears or the like. By selectively engaging or disengaging each of the first speed-changing clutch 5d2 and the second speed-changing clutch 5d3, the input power is speed-changed and output to the output shaft 5d4. The power output to the output shaft 5d4 is transmitted to a rear-wheel differential device 20R. The rear-wheel differential device 20R rotatably supports rear axles 21R to which the rear wheels 7R are attached.

The PTO power transmission unit (PTO driving unit) 5e includes a PTO clutch 5e1, a PTO propulsion shaft 5e2, and a PTO speed-changing unit 5e3. The PTO clutch 5e1 includes, for example, a hydraulic clutch or the like, and is shifted, through engagement and disengagement of the hydraulic clutch, between a state (engaged state) in which the power of the propulsion shaft 5a is transmitted to the PTO propulsion shaft 5e2 and a state (disengaged state) in which the power of the propulsion shaft 5a is not transmitted to the PTO propulsion shaft 5e2. The PTO speed-changing unit 5e3 includes a speed-changing clutch, a plurality of gears, and the like, and speed-changes the power (rotation speed) input from the PTO propulsion shaft 5e2 outputs the speed-changed power to the PTO speed-changing unit 5e3. The power of the PTO transmission 5e3 is transmitted to the PTO shaft 16 through gears and the like.

The front speed-changing unit 5f includes a first front speed-changing clutch 5f1 and a second front speed-changing clutch 5f2. The first front speed-changing clutch 5f1 and the second front speed-changing clutch 5f2 are capable of transmitting the power from the sub speed-changing unit 5d, and the power of the output shaft 5d4 is transmitted through gears and a transmission shaft, for example. The powers from the first front speed-changing clutch 5f1 and the second front speed-changing clutch 5f2 can be transmitted to front axles 21F via a front transmission shaft 22. Specifically, the front transmission shaft 22 is connected to the front wheel differential device 20F, and the front wheel differential device 20F rotatably supports the front axles 21F to which the front wheels 7F are attached.

Each of the first front speed-changing clutch 5f1 and the second front speed-changing clutch 5f2 includes a hydraulic clutch or the like. A fluid passage is connected to the first front speed-changing clutch 5f1, and the fluid passage is connected to a control valve to which hydraulic fluid delivered from the hydraulic pump is supplied. The first front speed-changing clutch 5f1 is shifted between the engaged state and the disengaged state according to an opening degree of the control valve. A fluid passage is connected to the second front speed-changing clutch 5f2, and the fluid passage is connected to a control valve. The second front speed-changing clutch 5f2 is shifted between the engaged state and the disengaged state according to an opening degree of the control valve. Each of the control valves is, for example, a two-position switching valve with a solenoid valve, which is shifted to the engaged state or disengaged state when magnetizing or demagnetizing each of solenoids of the solenoid valves.

When the first front speed-changing clutch 5f1 is in the disengaged state and the second front speed-changing clutch 5f2 is in the engaged state, the power of the sub speed-changing unit 5d is transmitted to the front wheels 7F through the second front speed-changing clutch 5f2. This results in four-wheel driving (4WD) in which the front and rear wheels are driven by the power and the rotational speeds of the front and rear wheels are approximately the same (constant speed 4WD state). On the other hand, when the first front speed-changing clutch 5f1 is in the engaged state and the second front speed-changing clutch 5f2 is in the disengaged state, the four-wheel driving is performed and the rotation speeds of the front wheels become faster than the rotation speeds of the rear wheels (accelerated 4WD state). In addition, when the first front speed-changing clutch 5f1 and the second front speed-changing clutch 5f2 are in the engaged state, two-wheel driving (2WD) in which the rear wheels are driven by power is performed because the power of the sub speed-changing unit 5d is not transmitted to the front wheels 7F.

Figure 2:
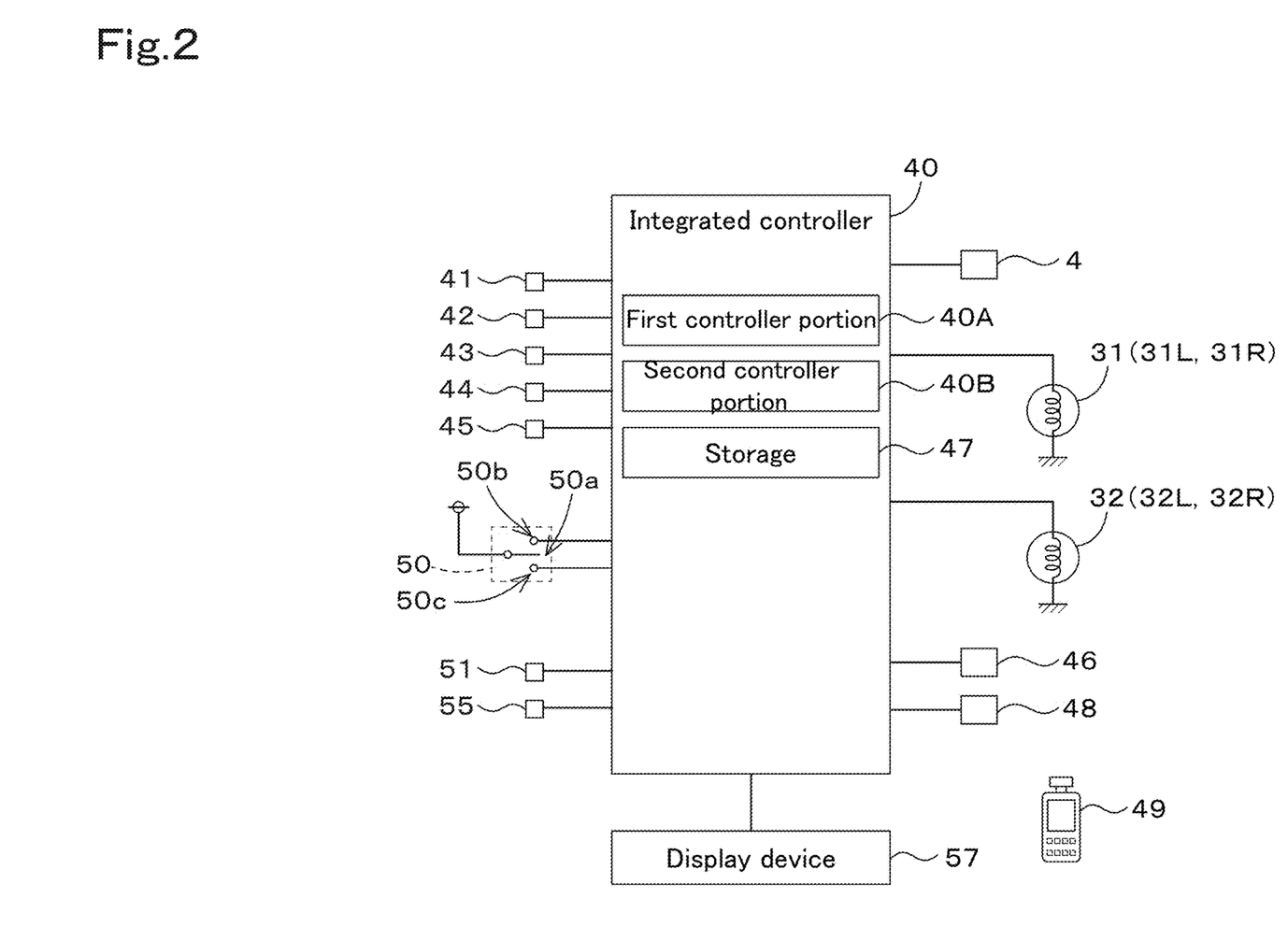
FIG. 2 is a control block diagram of a tractor.

As shown in FIG. 2, the tractor 1 includes an integrated controller 40. The integrated controller 40 includes a controller to control the prime mover 4 and a controller to control the first indicator light 31 and the second indicator light 32, and includes a single casing incorporating these components. The integrated controller 40 includes a CPU, an electric/electronic circuit, and the like, and stores predetermined computer programs.

An ignition switch 41, a parking switch 42, a speed-changing switch 43, a PTO switch 44, a seat switch 45, and a notification device 46 are connected to the integrated controller 40. The ignition switch 41, the parking switch 42, the speed-changing switch 43, and the PTO switch 44 are switches that can be operated by a driver.

The ignition switch 41 is operable at least to be turned on or off. The ignition switch 41 is turned on when the prime mover 4 is to be driven, and is turned off when the driving of the prime mover 4 is to be stopped. The parking switch 42 is a switch to detect parking of the traveling vehicle body (vehicle body) 3. Specifically, the parking switch 42 is operable to be turned on or off. When a parking lever (parking brake), which is swingably supported by the vehicle body 3, is shifted to a position (braking position) to brake the vehicle body 3, the parking switch 42 is turned on according to swinging of the parking lever to detect the parking. When the parking lever is shifted to a position (releasing position) to release the braking of the vehicle body 3, the parking switch 42 is turned off according to swinging of the parking lever and does not detect the parking.

The speed-changing switch 43 is a switch capable of detecting at least a neutral state (neutral position). In this regard, the speed-changing switch 43 is turned on when the speed-changing lever is in the neutral position, and is turned off when the speed-changing lever is in a position other than the neutral position.

The PTO switch 44 is operable to be turned on or off to selectively allow or disable the driving of the PTO shaft 16. For example, when the PTO switch 44 is turned on, the driving of the PTO shaft 16 is in an "allowed state", and when the PTO switch 44 is turned off, the driving of the PTO shaft 16 is in a "disabled state". When the PTO switch 44 is turned on, the PTO clutch 5e1 enters the engaged state, and the PTO shaft 16 is driven (rotated). On the other hand, when the PTO switch 44 is turned off, the PTO clutch 5e1 enters the disengaged state, and the driving (rotation) of the PTO shaft 16 stops.

The seat switch 45 is configured to detect that a driver is sitting on the driver's seat 10. For example, the seat switch 45 is operable to be turned on or off. The seat switch 45 is disposed in a portion (seating portion, backrest) of the driver's seat 6, or below the seat or the like. When the driver sits on the seat to contact the portion, the seat switch 45 is turned on to detect the seating. In addition, when the driver leaves the seat to be separated from the portion, the seat switch 45 is turned off to detect that the driver is not sitting on the seat.

The notification device 46 is a monitor on which various information can be displayed, a light source lamp such as an LED, a speaker that generates a warning sound, or the like. Only when a predetermined condition is satisfied, the notification device 46 issues a warning to be displayed on the monitor, a warning including lighting and flashing the light source lamp, or a warning including generating a warning sound.

In addition, a directional indicator switch 50 and the hazard switch 51 are connected to the integrated controller 40. The directional indicator switch 50 and the hazard switch 51 are switches that can be operated by the driver. The directional indicator switch 50 is configured to be shifted in accordance with the indicator lever that is operated to indicate a traveling direction of the vehicle body 3. In a case where the indicator lever is in the neutral state (a case of not indicating the traveling direction), the directional indicator switch 50 is in the neutral position 50a. The directional indicator switch 50 is shifted to a left instructing position 50b when the indicator lever is on one directional side for leftward direction indication, and is shifted to a right instructing position 50c when the indicator lever is on the other directional side for rightward direction indication. Hereafter, for convenience of explanation, the state where the directional indicator switch 50 is in the neutral position 50a may be referred to as an "off-state", the state where the directional indicator switch 50 is in the left instructing position 50b may be referred to as a "left-on and right-off state", and the state where the directional indicator switch 50 is in the right instructing position 50c may be referred to as a "left-off and right-on state".

The hazard switch 51 is configured to be shifted in accordance with a hazard operating tool that instructs to notify the hazard. The hazard switch 51 is turned on when the hazard operating tool is shifted to one directional side to provide notification of the hazard, and is turned off when the hazard operating tool is shifted to the other directional side to not provide notification of the hazard.

In addition, a connector 48 is provided in the integrated controller 40. The connector 48 is a connector or the like to which a cable to transmit data and the like is connected. An external terminal 49 can be connected to the connector 48. The external terminal 49 may be a terminal device certified by a manufacturer of the tractor 1, a sales dealer who sells the tractor or a maintenance store who maintains the tractor 1, or a controller of the tractor, or the like. In a case where the controller of the tractor is connected as the external terminal 49, the connector 48 can be configured to allow the CAN communication. The external terminal 49 is a terminal capable of transmitting data such as computer programs, parameters and the like to the integrated controller 40. In a case where the external terminal 49 is connected to the connector 48 of the integrated controller 40, the data output from the external terminal 49 is written to the integrated controller 40 when the certification is performed between the integrated controller 40 and the external terminal 49 and the certification is established. Note that it is possible to omit the certification with the external terminal 49 at a stage of manufacturing the integrated controller 40.

The integrated controller 40 is configured or programmed to include a first controller portion 40A, a second controller portion 40B, and a storage 47. Each of the first controller portion 40A and the second controller portion 40B includes an electric/electronic circuit provided in the integrated controller 40, a computer program stored in the integrated controller 40, or the like. The storage 47 includes a non-volatile memory or the like.

The first controller portion 40A controls the prime mover 4 based on a driving condition. The driving condition is a condition to determine whether or not to drive the prime mover 4. Driving condition data indicating the driving condition is stored in the storage 47.

Figure 3A:
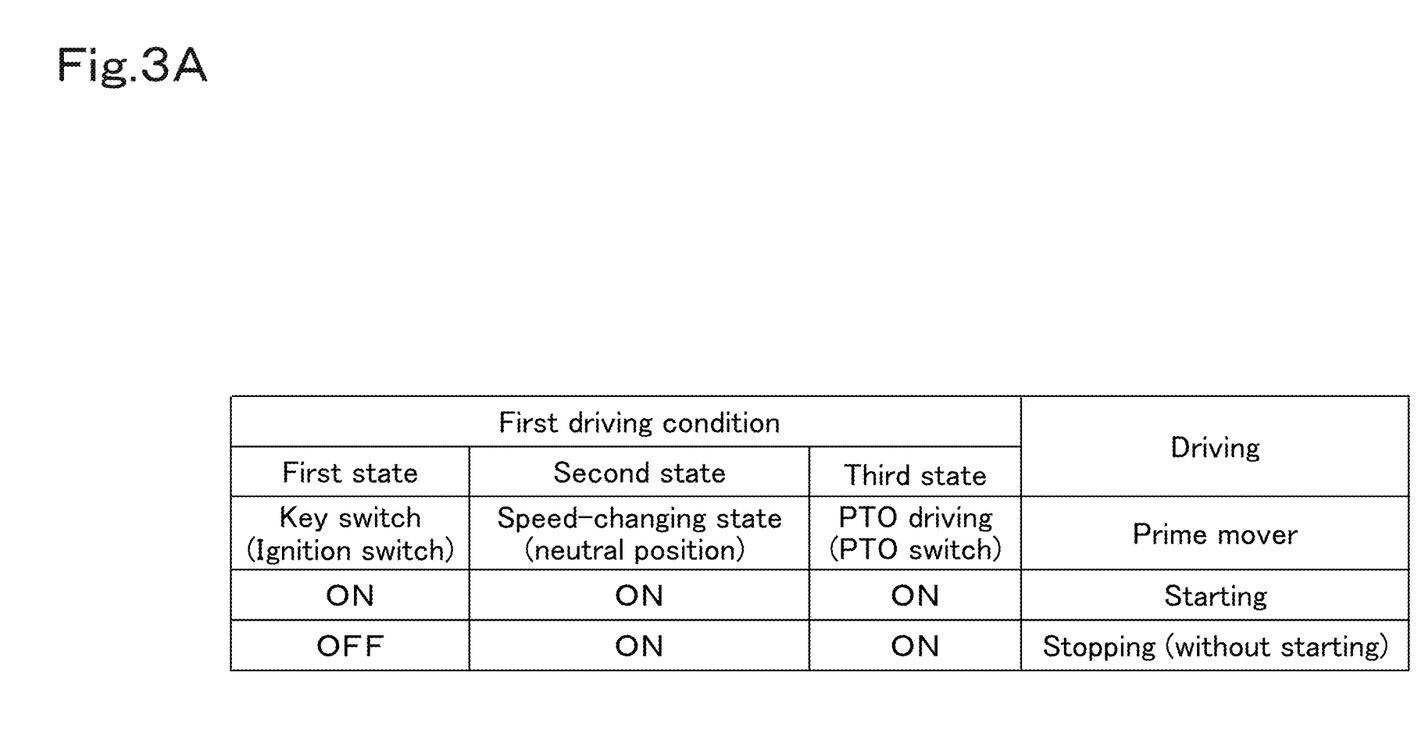
FIG. 3A is a view showing an example of a first driving condition.
Figure 3B:
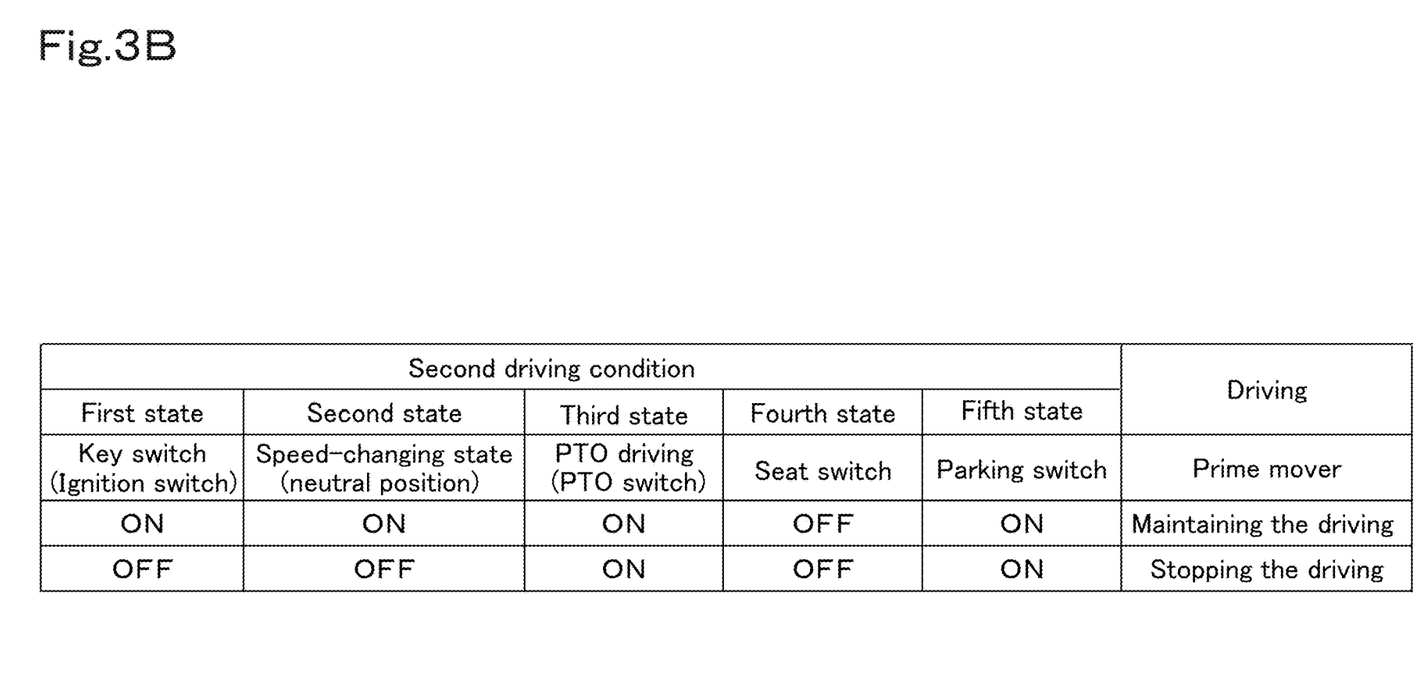
FIG. 3B is a view showing an example of a second driving condition.

FIGS. 3A and 3B show examples of the driving conditions. FIG. 3A shows the driving conditions (first driving conditions) to start the prime mover 4. Parameters of the first driving conditions include a first state indicating a switching state of the ignition switch 41, a second state indicating a speed-changing state of the speed controller 5, and a third state indicating a driving state of the PTO driving unit 5e.

As shown in FIG. 3A, for example, when the first, second and third states are all in on-states, the first controller portion 40A outputs a driving start signal to the prime mover 4 to start the prime mover 4. In addition, when the first state is in an off-state, the second and third states are in the on-states, the first controller portion 40A does not output the driving start signal to the prime mover 4 and does not start the prime mover 4. Or, when the first state is in the on-state and the second and third states are in the off-states, the first controller portion 40A does not output the driving start signal to the prime mover 4 and does not start the prime mover 4.

FIG. 3B shows driving conditions (second driving conditions) to determine, after starting the prime mover 4, whether or not to maintain the driving of the prime mover 4. In addition to the first, second and third states, parameters of the second driving condition include a switching state of the seat switch 45 (fourth state) and a switching state of the parking switch 42 (fifth state).

As shown in FIG. 3B, when the first, second, third and fifth states are in the on-states and the fourth state is in the off-state, the first controller portion 40A outputs a driving maintaining signal to the prime mover 4 to maintain the driving of the prime mover 4. When the first, third and fifth states are in the on-states and the second and fourth states are in the off-states, the first controller portion 40A outputs a driving stopping signal to the prime mover 4 to stop the driving of the prime mover 4. In a case where the first and fourth states are in the on-state, the first controller portion 40A outputs the driving maintaining signal to the prime mover 4 to maintain the driving of the prime mover 4, regardless of whether the second, third and fifth states are in the on-state or in the off-state.

The notification device 46 generates the warning when at least the first state is in the on-state and the third and fourth states are in the off-states. That is, the warning is generated in a case where the PTO switch 44 is turned off and the seat switch 45 is turned off even when the ignition switch 41 is turned on. The driving conditions (first driving condition and second driving condition) are examples and are not limited to those described above.

The second controller portion 40B controls the first indicator light 31 and the second indicator light 32 based on lighting conditions. The lighting conditions are conditions for lighting, flashing, and extinguishing the first and second indicator lights 31 and 32. The lighting condition data indicating the lighting conditions is stored in the storage 47.

Figure 4:
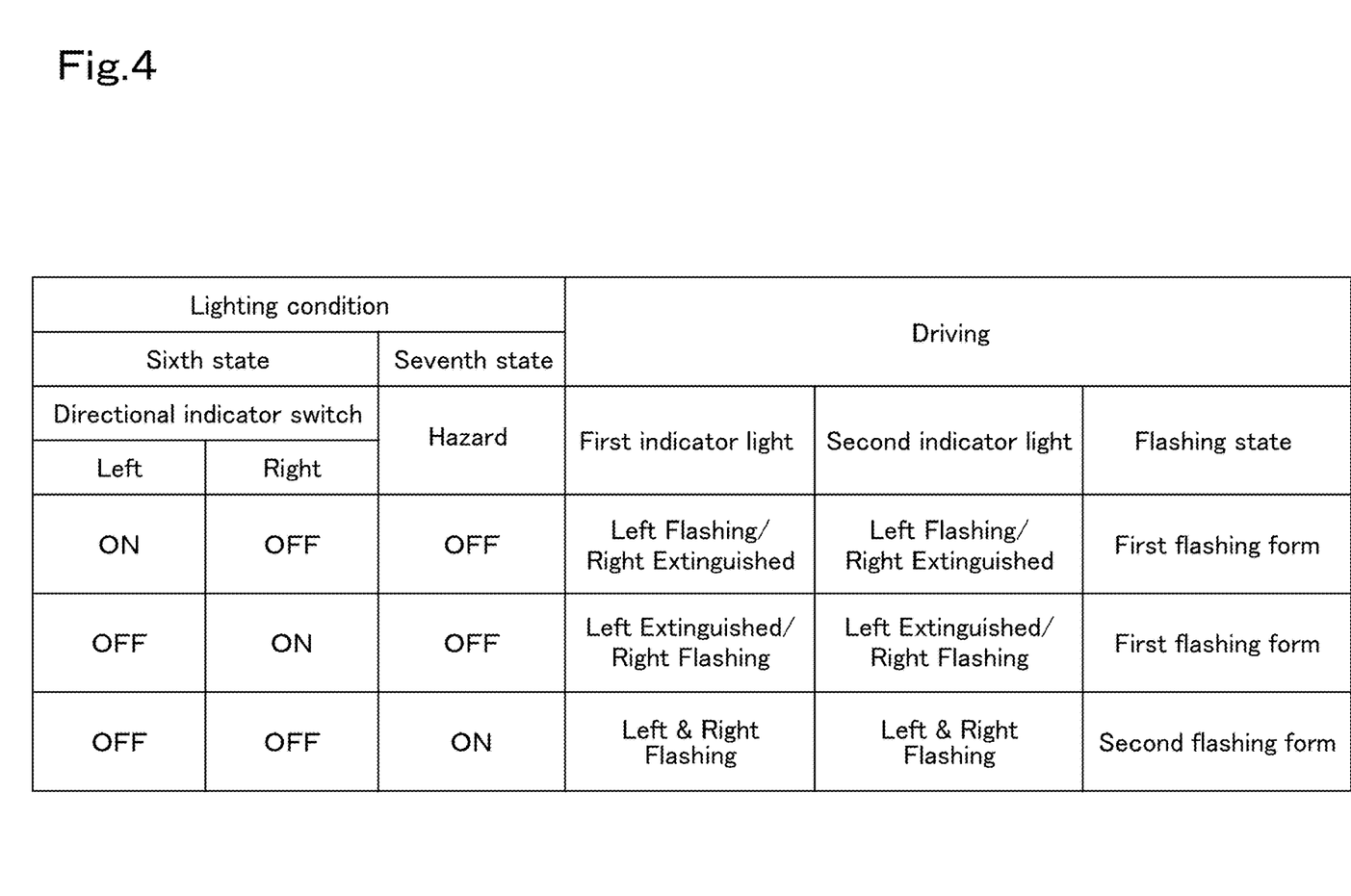
FIG. 4 is a view showing an example of a lighting condition.

The parameters of the lighting conditions include a switching state of the directional indicator switch 50 (sixth state) and a switching state of the hazard switch 51 (seventh state). FIG. 4 shows examples of the lighting conditions. As shown in FIG. 4, when the sixth state is in a left-on and right-off state and the seventh state is in the off-state, the second controller portion 40B flashes the first left indicator 31L and the second left indicator 32L in the first flashing pattern. When the sixth state is in the left-off and right-on state and the seventh state is in the off-state, the second controller portion 40B flashes the first right indicator 31R and the second right indicator 32R in the first flashing form. When the sixth state is in the off-state and the seventh state is in the on-state, the second controller portion 40B flashes the first left indicator 31L, the first right indicator 31R, the second left indicator 32L, and the second right indicator 32R in a second flashing pattern. The flashing form indicates intervals of the flashing, and the like, and the first flashing pattern, for example, is different from the second flashing pattern in the flashing intervals (time from the lighting to the extinguishing). The lighting conditions are examples and are not limited to those described above.

Figure 5A:
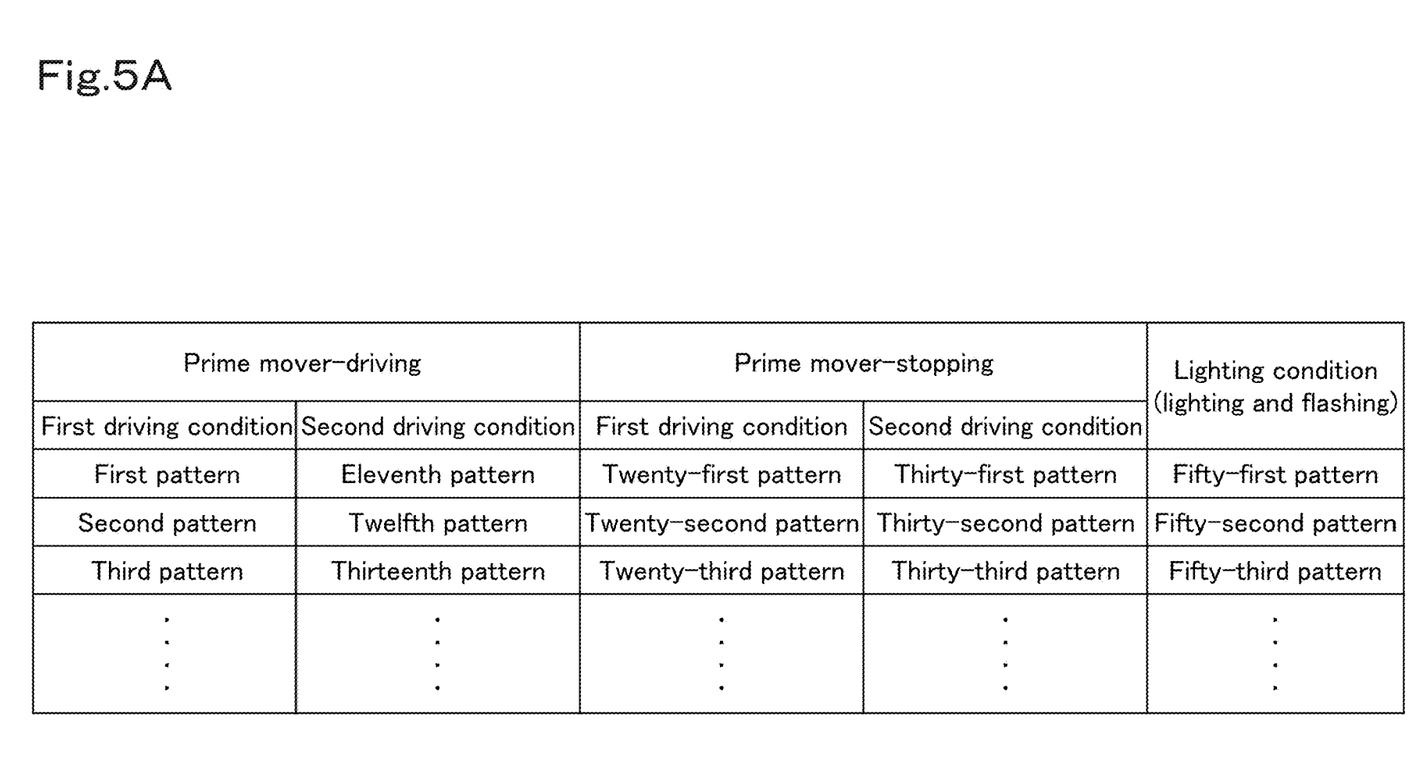
FIG. 5A is a view showing an example of a combination of the first driving condition and the lighting condition.

As shown in FIG. 5A, there are, in the first driving condition, many combinations of the on-states and the off-states in the first, second and third states (first pattern, second pattern, and so on) when the prime mover 4 is driven, and there are, in the second driving condition, many combinations of the on-states and the off-states in the first, second, third, fourth, and fifth states (eleventh pattern, twelfth pattern, and so on) when the prime mover 4 is driven.

There are, in the first driving condition, many combinations of the on-states and the off-states in the first, second and third states (twenty-first pattern, twenty-second pattern, and so on) when the prime mover 4 is stopped, and there are, in the second driving condition, many combinations of the on-states and the off-states in the first, second, third, fourth, and fifth states (thirty-first pattern, thirty-second pattern, and so on) when the prime mover 4 is stopped.

In the lighting conditions, there are many combinations of the on-state and off-state in the sixth state, the on-state and off-state in the seventh state, and lighting patterns (fifty-first pattern, fifty-second pattern, and so on) when lighting, flashing, and extinguishing the first indicator light 31 and the second indicator light 32.

Figure 5B:
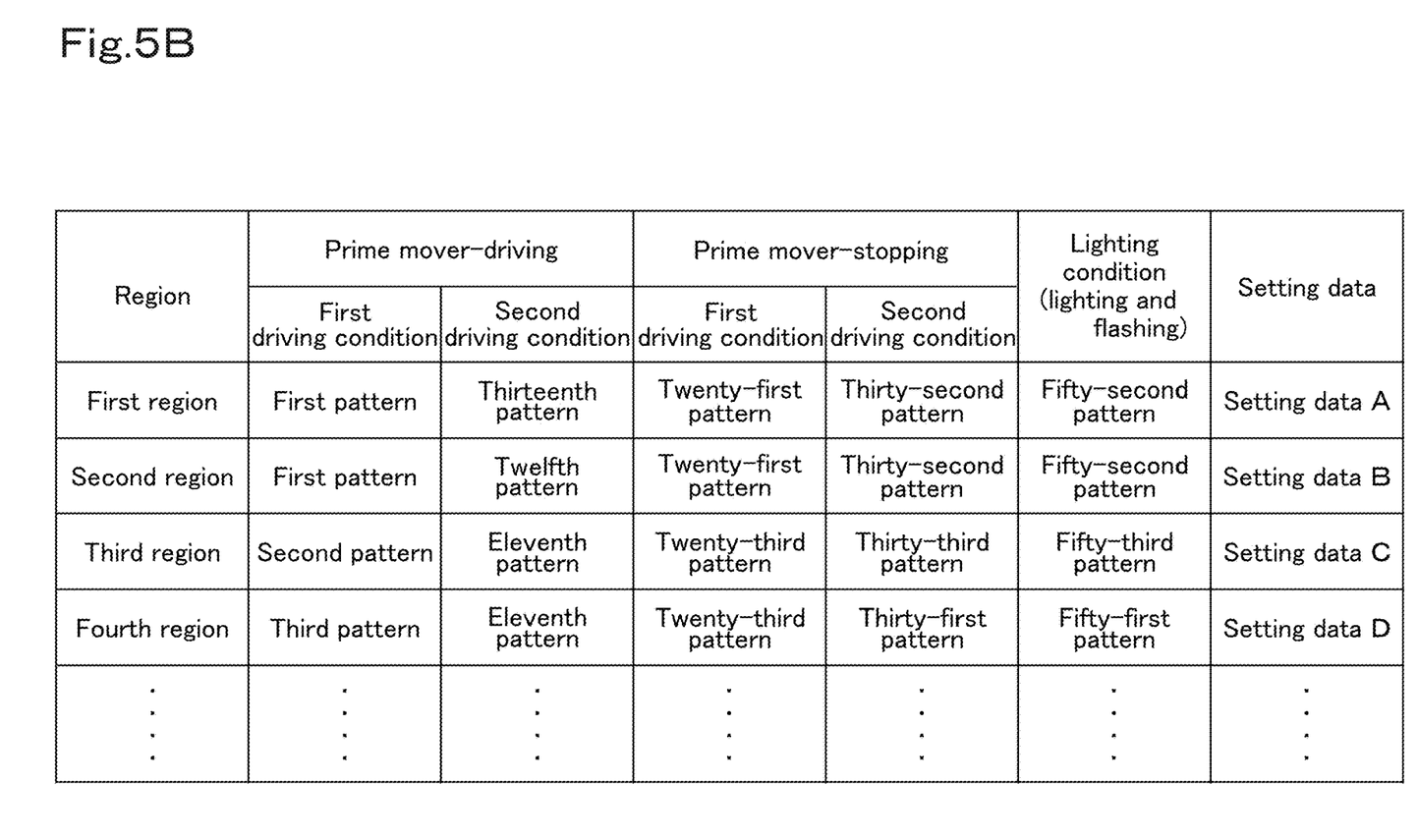
FIG. 5B is a view showing a relationship between setting data and a combination of the driving condition and the lighting condition.

As shown in FIG. 5B, the patterns of driving conditions (first driving condition, second driving condition) and the patterns of the lighting conditions are determined specifically for destinations of the integrated controller 40, that is, regions (first region, second region, third region, fourth region, and so on), and there is the setting data including the combination of driving conditions and lighting conditions which are determined specifically for the region (driving condition data, lighting condition data). The setting data for each region is stored in the external terminal 49.

Destination information indicating the destination (region) is stored in the integrated controller 40. During manufacturing or maintenance of the integrated controller 40, the external terminal 49 is connected to the connector 48. In a case where the combination of the driving conditions and the lighting conditions coincides with a predetermined combination when the setting data is sent from the external terminal 49, the integrated controller 40 writes the setting data to the storage 47. For example, in a case where the destination of the integrated controller 40 is the second region, the setting data B is transferred and written to the storage 47 when the integrated controller 40 obtains the setting data B, and the setting data C is not written to the storage 47 when the integrated controller 40 obtains the setting data C.

In the above-described preferred embodiment, the integrated controller 40 stores, in the storage 47, only the destination information, i.e., the setting data adapted to the destination (region). However, the integrated controller 40 may store, in the storage 47, a plural pieces of setting data adapted to a plurality of regions including its own destination. In this case, the integrated controller 40 may change the setting data to another setting data to be used for control by the integrated controller 40 when the region is determined by a switch (region changeover switch) 55 disposed around the driver's seat 10 or the like. The region changeover switch 55 is, for example, a rotary switch, and the region can be selected by turning a pick portion thereof.

In the integrated controller 40, for example, in a case where the second region is the destination thereof, the first controller portion 40A and the second controller portion 40B of the integrated controller 40 usually perform the control using the default setting data B. When the first region is determined as the region by the region changeover switch 55, the first controller portion 40A and the second controller portion 40B of the integrated controller 40 perform the control using the setting data A. For example, a display device 57 disposed around the driver's seat 10 displays a plurality of destinations (regions) and a list of driving and lighting conditions adapted to the regions. By operating the region changeover switch 55, the region is changed from the currently-selected region, and the setting data can be switched by operating the display device 57 or the region changeover switch 55 to determine the region.

The storage 47 stores a first disconnection judgment condition to judge disconnection of the first indicator light 31 and a second disconnection judgment condition to judge disconnection of the second indicator light 32. The first disconnection judgment condition and the second disconnection judgment condition are different conditions from each other, and there is a difference between the conditions in voltage (current) at which the integrated controller 40 determines the disconnection. For example, in a case where a wattage required to light or flash the first indicator light 31 is represented by "W1" and a wattage required to light or flash the second indicator light 32 is represented by "W2", W2 is higher than W1, a voltage (current) V1 to detect the first disconnection judgment condition is set to be lower than a voltage (current) V2 to detect the second disconnection judgment condition. The second controller portion 40B determines the disconnection when a voltage of a line connecting the first indicator light 31 and the integrated controller 40 falls to be equal to or less than the voltage V1, that is, when the first disconnection judgment condition is satisfied. And, the second controller portion 40B determines the disconnection when a voltage of a line connecting the second indicator light 32 and the integrated controller 40 falls to be equal to or less than the voltage V2, that is, when the second disconnection judgment condition is satisfied. When the second controller portion 40B detects the disconnection of the first indicator light 31, the second controller portion 40B displays a warning indicating that the first indicator light 31 is disconnected (disconnection in lamp, or the like) on the display unit 57 disposed around the driver's seat 10. When the second controller portion 40B detects the disconnection of the second indicator light 32, the second controller portion 40B displays a warning indicating that the second indicator light 32 is disconnected (disconnection in lamp, or the like) on the display unit 57. That is, the second controller portion 40B is capable of independently providing notification of the disconnection of the first indicator light 31 on the tractor 1 side and the disconnection of the second indicator light 32 on the working device 2 side.

The working vehicle 1 includes the prime mover 4 provided on the vehicle body 3, the first indicator light 31 provided on the vehicle body 3, the second indicator light provided on the working device connected to the vehicle body 3, and the integrated controller 40 including the first controller portion 40A to control the prime mover 4, and the second controller portion 40B to control the first indicator light 31 and the second indicator light 32. According to this configuration, since the integrated controller 40 is capable of controlling the prime mover 4 and the indicator lights (first indicator light 31 and second indicator light 32), the settings (conditions) for the prime mover 4 and the indicator lights (first indicator light 31 and second indicator light 32) can be changed at the same time to be easily adapted to the destination.

The integrated controller 40 includes the storage 47 to store the driving condition required for the first controller portion 40A to drive the prime mover 4, and the lighting condition required for the second controller portion 40B to either light or extinguish each of the first indicator light 31 and the second indicator light 32. According to this configuration, the driving condition for the prime mover 4 and the conditions for the indicator lights (first indicator light 31 and second indicator light 32) can be changed at the same time.

The working vehicle 1 further includes the connector 48 connectable to the external terminal 49 to store setting data including the driving condition and the lighting condition can be connected to the connector 48. The integrated controller 40 is configured or programmed to cause the storage 47 store the setting data when the setting data is transmitted from the external terminal 49 to the integrated controller 40 via the connector 48 and when a combination of the driving condition and the lighting condition in the transmitted setting data coincides with a predetermined combination of the driving condition and the lighting condition. According to this configuration, the setting data can be stored (memorized) in the storage 47 when the combination of the driving condition and the lighting condition is adapted to the destination.

The working vehicle 1 further includes the ignition switch 41 to perform starting of the prime mover 4, the speed controller 5 to change the speed of the vehicle body 3 during traveling, and the PTO driver 5e to be driven by power from the prime mover 4 and transmit a driving force thereof to the working device 2. The first controller portion 40A is configured or programmed to drive the prime mover 4 when a switching state of the ignition switch 41, a speed-changing state of the speed controller 5 and a driving state of the PTO driver 5e coincide with those defined as the driving condition. According to this configuration, the working device 2 is capable of performing work under various conditions.

The working vehicle 1 further includes the directional indicator switch 50 to flash the first and second indicator lights 31 and 32 for direction indication, and the hazard switch 51 to flash the first and second indicator lights 31 and 32 for hazard indication. The second controller portion 40B is configured or programmed to flash each of the first and second indicator lights 31 and 32 when an operation state of the directional indicator switch 50 and an operation state of the hazard switch 51 coincide with those defined as the driving condition. According to this configuration, when the driving conditions for direction indication and hazard indication are the driving conditions adapted to the destination, the direction indication and the hazard indication can be flashed according to specifications for the destination.

The storage 47 has previously stored therein the first disconnection judgment condition required to determine that the first indicator light 31 is disconnected and a second disconnection judgment condition required to determine that the second indicator light 32 is disconnected. The second controller portion 40B is configured or programmed to determine that the first indicator light 31 is disconnected when the first indicator light 31 is determined to be in the first disconnection judgment condition, and to determine that the second indicator light 32 is disconnected when the second indicator light 32 is determined to be in the second disconnection judgment condition. According to this configuration, disconnection of the first indicator light 31 on the working vehicle 1 side and disconnection of the second indicator light 32 on the working device 2 side can be determined separately.

The integrated controller 40 includes a single casing. According to this configuration, compared with a case where a controller to control the prime mover 4 and a controller to control the first and second indicator lights 31 and 32 are separately configured, the integrated controller 40 can not only be made compact but can also be easily adapted to a destination.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

All combinations of the configurations described in the first to fourth preferred embodiments can be implemented as preferred embodiments of the present invention.

What is claimed is:

1. A working vehicle, comprising:
a vehicle body;
a prime mover provided on the vehicle body;
a first left indicator light and a first right indicator light provided on the vehicle body;
a second left indicator light and a second right indicator light provided on a working device connected to the vehicle body; and
an integrated controller including:
a first controller portion to control the prime mover;
a second controller portion to control the first left indicator light, the first right indicator light, the second left indicator light, and the second right indicator light; and
a storage; wherein
the first controller portion starts the prime mover based on a plurality of first driving conditions which are defined by on-states and off-states of a plurality of first parameters, and maintains driving of the prime mover based on one of a plurality of second driving conditions which are defined by on-states and off states of a plurality of second parameters;
the second controller portion lights, extinguishes, or flashes the first left indicator light, the first right indicator light, the second left indicator light, and the second right indicator light based on one of a plurality of lighting conditions which are defined by on-states and off states of a plurality of third parameters; and
the storage stores a plurality of setting data indicating the plurality of lighting conditions, which are determined by one of the plurality of first driving conditions and one of the plurality of second driving conditions, for a plurality of destinations of the integrated controller on the working vehicle to be exported;

the storage stores a first disconnection judgment condition to determine disconnection of the first left indicator light and the first right indicator light;

the storage stores a second disconnection judgment condition to determine disconnection of the second left indicator light and the second right indicator light; and the second controller portion is configured or programmed to:

determine that the first left indicator light and the first right indicator light are disconnected when the first left indicator light and the first right indicator light meet the first disconnection judgment condition; and determine that the second left indicator light and the second right indicator light are disconnected when the second left indicator light and the second right indicator light meet the second disconnection judgment condition.

2. The working vehicle according to claim 1, wherein the integrated controller includes a single casing.

3. The working vehicle according to claim 1, further comprising:

a connector provided in the integrated controller and connectable to an external terminal; wherein the storage stores each of the plurality of the setting data received through the connector.

4. The working vehicle according to claim 1; wherein the on-states and the off-states of the plurality of first parameters include on-states and off-states of an ignition switch, a speed-changing switch, and a PTO switch which are connected to the integrated controller; and the on-states and the off-states of the plurality of second parameters include on-states and off-states of the ignition switch, the speed-changing switch, the PTO switch, a parking switch, and a seat switch which are connected to the integrated controller.

5. The working vehicle according to claim 1; wherein the on-states and the off-states of the plurality of third parameters include:

on-states and off-states of a directional indicator switch which is connected to the integrated controller to switch the first left indicator light and the second left indicator light or the first right indicator light and second right indicator light to be flashed; and on-states and off-states of a hazard switch which is connected to the integrated controller to switch the first left indicator light, the first right indicator light, the second left indicator light, and the second right indicator light to be flashed; and the second controller portion is configured or programmed:

based on the on-states and the off-states of the directional indicator switch, to flash the first left indicator light and the second left indicator light or the first right indicator and the second right indicator light in a first flashing interval; and based on the on-states and off-states of the hazard switch, to flash all of the first left indicator light, the first right indicator light, the second left indicator light, and the second right indicator light in a second flashing interval which is different from the first flashing interval.

6. A working vehicle, comprising:

a vehicle body:

a prime mover provided on the vehicle body:

a first left indicator light and a first right indicator light provided on the vehicle body:

a second left indicator light and a second right indicator light provided on a working device connected to the vehicle body:

an integrated controller including:

a first controller portion to control the prime mover;

a second controller portion to control the first left indicator light, the first right indicator light, the second left indicator light, and the second right indicator light; and a storage; and a connector provided in the integrated controller and connectable to an external terminal; wherein the first controller portion starts the prime mover based on a plurality of first driving conditions which are defined by on-states and off-states of a plurality of first parameters, and maintains driving of the prime mover based on one of a plurality of second driving conditions which are defined by on-states and off states of a plurality of second parameters;

the second controller portion lights, extinguishes, or flashes the first left indicator light, the first right indicator light, the second left indicator light, and the second right indicator light based on one of a plurality of lighting conditions which are defined by on-states and off states of a plurality of third parameters; and the storage stores a plurality of setting data indicating the plurality of lighting conditions, which are determined by one of the plurality of first driving conditions and one of the plurality of second driving conditions, for a plurality of destinations of the integrated controller on the working vehicle to be exported; and the storage stores one of the plurality of the setting data for one of the plurality of destinations of the integrated controller on the working vehicle to be exported when the storage receives the one of the plurality of the setting data through the connector and from the external terminal.

7. A working vehicle, comprising:

a vehicle body:

a prime mover provided on the vehicle body;

a first left indicator light and a first right indicator light provided on the vehicle body;

a second left indicator light and a second right indicator light provided on a working device connected to the vehicle body;

an integrated controller including:

a first controller portion to control the prime mover;

a second controller portion to control the first left indicator light, the first right indicator light, the second left indicator light, and the second right indicator light; and a storage; and a region changeover switch; wherein the first controller portion starts the prime mover based on a plurality of first driving conditions which are defined by on-states and off-states of a plurality of first parameters, and maintains driving of the prime mover based on one of a plurality of second driving conditions which are defined by on-states and off states of a plurality of second parameters;

the second controller portion lights, extinguishes, or flashes the first left indicator light, the first right indicator light, the second left indicator light, and the second right indicator light based on one of a plurality of lighting conditions which are defined by on-states and off states of a plurality of third parameters;

the storage stores a plurality of setting data indicating the plurality of lighting conditions, which are determined by one of the plurality of first driving conditions and one of the plurality of second driving conditions, for a plurality of destinations of the integrated controller on the working vehicle to be exported;

the region changeover switch is to be operated by an operator to select one of the plurality of destinations of the integrated controller on the working vehicle to be exported; and the second controller portion lights, extinguishes, or flashes the first left indicator light, the first right indicator light, the second left indicator light, and the second right indicator light based on one of the plurality of lighting conditions for the selected one of the plurality of destinations of the integrated controller on the working vehicle.

8. A working vehicle, comprising:
a vehicle body:
a prime mover provided on the vehicle body:
a first left indicator light and a first right indicator light provided on the vehicle body:
a second left indicator light and a second right indicator light provided on a working device connected to the vehicle body; and
an integrated controller including:
  a first controller portion to control the prime mover:
  a second controller portion to control the first left indicator light, the first right indicator light, the second left indicator light, and the second right indicator light; and
  a storage; wherein
the first controller portion starts the prime mover based on a plurality of first driving conditions which are defined by on-states and off-states of a plurality of first parameters, and maintains driving of the prime mover based on one of a plurality of second driving conditions which are defined by on-states and off states of a plurality of second parameters;

the second controller portion lights, extinguishes, or flashes the first left indicator light, the first right indicator light, the second left indicator light, and the second right indicator light based on one of a plurality of lighting conditions which are defined by on-states and off states of a plurality of third parameters;

the storage stores a plurality of setting data indicating the plurality of lighting conditions, which are determined by one of the plurality of first driving conditions and one of the plurality of second driving conditions, for a plurality of destinations of the integrated controller on the working vehicle to be exported;

the on-states and the off-states of the plurality of third parameters include:
  on-states and off-states of a directional indicator switch which is connected to the integrated controller to switch the first left indicator light and the second left indicator light or the first right indicator light and second right indicator light to be flashed; and
  on-states and off-states of a hazard switch which is connected to the integrated controller to switch the first left indicator light, the first right indicator light, the second left indicator light, and the second right indicator light to be flashed;

the second controller portion is configured or programmed:
  based on the on-states and the off-states of the directional indicator switch, to flash the first left indicator light and the second left indicator light or the first right indicator and the second right indicator light in a first flashing interval; and
  based on the on-states and off-states of the hazard switch, to flash all of the first left indicator light, the first right indicator light, the second left indicator light, and the second right indicator light in a second flashing interval which is different from the first flashing interval; and the second controller portion is configured or programmed to set the first flashing interval different from the second flashing interval in response to one of the plurality of destinations of the integrated controller on the working vehicle to be exported.

* * * * *